(12) United States Patent
Kardashov et al.

(10) Patent No.: US 10,284,464 B2
(45) Date of Patent: *May 7, 2019

(54) NETWORK DISCOVERY APPARATUS

(71) Applicant: MARVELL WORLD TRADE LTD., St. Michael (BB)

(72) Inventors: Timor Kardashov, Kyriat Ono (IL); Maxim Kovalenko, Rehovot (IL); Haim Daniel, Ashdod (IL); Anatoli Plotnikov, Petach Tikva (IL)

(73) Assignee: Marvell World Trade Ltd., St. Michael (BB)

( * ) Notice: Subject to any disclaimer, the term of this patent is extended or adjusted under 35 U.S.C. 154(b) by 75 days.

This patent is subject to a terminal disclaimer.

(21) Appl. No.: 15/455,799

(22) Filed: Mar. 10, 2017

(65) Prior Publication Data

US 2017/0187613 A1 Jun. 29, 2017

Related U.S. Application Data

(63) Continuation of application No. 14/108,897, filed on Dec. 17, 2013, now Pat. No. 9,608,877.

(Continued)

(51) Int. Cl.
*H04L 12/26* (2006.01)
*H04L 12/721* (2013.01)
(Continued)

(52) U.S. Cl.
CPC ............ *H04L 45/38* (2013.01); *H04L 43/026* (2013.01); *H04L 45/26* (2013.01); *H04L 69/22* (2013.01);
(Continued)

(58) Field of Classification Search
CPC ........ H04L 43/026; H04L 41/06; H04L 12/56
See application file for complete search history.

(56) References Cited

U.S. PATENT DOCUMENTS 6,233,242 B1    5/2001   Mayer et al.
6,453,360 B1    9/2002   Muller et al.
(Continued)

FOREIGN PATENT DOCUMENTS

CN           101146200 A     3/2008

OTHER PUBLICATIONS

International Search Report and Written Opinion in International Patent Application No. PCT/IB13/03231, dated Jun. 27, 2014 (7 pages).

(Continued)

*Primary Examiner* — Lan-Huong Truong

(57) ABSTRACT

A network device has a packet input unit, a checking unit, and a discovery unit. The packet input unit is configured to receive ingress packets. The checking unit is configured to determine whether identifying characteristics of received ingress packets match stored identifying characteristics of a packet flow that is stored in a memory, to perform a network action when the identifying characteristic of the received ingress packet matches the stored identifying characteristic. The discovery unit is configured to intercept an egress packet received from the control plane processor, the egress packet corresponding to the received ingress packet, to determine one or more differences in selected portions of a header portion of the received ingress packet resulting from processing at the control plane processor, and to store in the memory a new network action based on the one or more differences.

14 Claims, 17 Drawing Sheets

Related U.S. Application Data

(60) Provisional application No. 61/738,280, filed on Dec. 17, 2012.

(51) Int. Cl.
*H04L 29/06* (2006.01)
*H04L 12/24* (2006.01)
*H04L 12/46* (2006.01)
*H04L 29/12* (2006.01)

(52) U.S. Cl.
CPC .......... *H04L 12/4641* (2013.01); *H04L 41/06* (2013.01); *H04L 61/6068* (2013.01)

(56) References Cited

U.S. PATENT DOCUMENTS

| | | |
|---|---|---|
| 6,629,125 B2 | 9/2003 | Elzur et al. |
| 6,728,929 B1 | 4/2004 | Luong |
| 6,738,349 B1 | 5/2004 | Cen |
| 6,958,977 B1 | 10/2005 | Mitrani et al. |
| 7,742,406 B1 | 6/2010 | Muppala |
| 7,961,637 B2 | 6/2011 | McBeath |
| 8,179,995 B2 | 5/2012 | Ishihara et al. |
| 8,316,435 B1 | 11/2012 | Varadhan et al. |
| 8,842,687 B1 * | 9/2014 | Jackson ................ H04L 49/208 370/419 |
| 9,356,859 B2 * | 5/2016 | Hanif ...................... H04L 45/22 |
| 9,608,877 B2 | 3/2017 | Kardashov et al. |
| 2002/0036983 A1 | 3/2002 | Widegren et al. |
| 2003/0112809 A1 | 6/2003 | Bharali et al. |
| 2006/0101159 A1 | 5/2006 | Yeh et al. |
| 2007/0127382 A1 * | 6/2007 | Hussain .................. H04L 45/00 370/235 |
| 2008/0049621 A1 * | 2/2008 | McGuire ............. H04L 12/6418 370/236.2 |
| 2009/0092136 A1 * | 4/2009 | Nazareth ............... H04L 45/745 370/392 |
| 2011/0019669 A1 * | 1/2011 | Ma .......................... H04L 45/00 370/389 |
| 2011/0064093 A1 | 3/2011 | Mattson et al. |
| 2011/0176556 A1 | 7/2011 | Guo et al. |
| 2011/0317701 A1 * | 12/2011 | Yamato .................. H04L 45/04 370/392 |
| 2012/0127995 A1 | 5/2012 | Singh et al. |
| 2013/0155902 A1 | 6/2013 | Feng et al. |
| 2014/0029449 A1 | 1/2014 | Xu et al. |
| 2014/0133305 A1 | 5/2014 | Brolin et al. |
| 2015/0249587 A1 | 9/2015 | Kozat et al. |

OTHER PUBLICATIONS

International Preliminary Report on Patentability in International Patent Application No. PCT/IB13/03231, dated Jun. 23, 2015 (6 pages).

Office Action in Chinese Patent Application No. 2013800659258, dated Aug. 31, 2017, with English translation (26 pages).

Search Report in Chinese Patent Application No. 2013800659258, dated Aug. 9, 2017 (2 pages).

\* cited by examiner

NETWORK DISCOVERY APPARATUS

CROSS-REFERENCE TO RELATED APPLICATION

This application is a continuation of U.S. application Ser. No. 14/108,897, filed Dec. 17, 2013, which claims priority to and the benefit of U.S. Provisional Patent Application No. 61/738,280 filed Dec. 17, 2012 the disclosures of all of which are incorporated by reference herein in their entireties.

BACKGROUND

The present disclosure relates to a network device that processes packets.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

A network device typically includes a control plane processor which implements processing operations to make determinations related to forwarding, routing, access control lists, and the like. Control plane processors located in a network upstream of a final destination typically update the packet header information of incoming packets. A packet flow exists when a number of received packets are identified as having the same or similar characteristics, for example the packets are received on the same port or are from the same source, are to be forwarded to the same destination, are the same type of packet and are to be handled with a same quality of service. Network devices encounter situations in which multiple, different flows need to be handled concurrently.

SUMMARY

One or more example embodiments of the disclosure generally relate to a network discovery apparatus that monitors packets as they ingress to and egress from a control plane of a network device. Such observations are used to detect packet flows as well as to learn the particular changes made to the packets in those flows. Packet flow information is stored together with information indicating what changes the control plane made to the packets. For newly received packets that match a particular packet flow, the network discovery apparatus intercepts the packets and makes the same kind of changes to the packets that the control plane had previously been making. Newly received packets that do not match any defined flow are simply monitored by the network discovery apparatus as they are passed to the control plane.

In an example embodiment, a network device includes a packet input unit configured to receive ingress packets, the ingress packets having an ingress packet identifying characteristic; a checking unit configured to determine whether the identifying characteristic of a received ingress packet matches a stored identifying characteristic of a packet flow that is stored in a memory, to perform on the received ingress packet a network action associated with the stored identifying characteristic when the identifying characteristic of the received ingress packet matches the stored identifying characteristic, and to provide the received ingress packet to a control plane processor configured to process the received ingress packet to determine the network action to be performed on the received ingress packet when the identifying characteristic of the received ingress packet does not match the stored identifying characteristic; and a discovery unit configured to intercept an egress packet received from the control plane processor, the egress packet corresponding to the received ingress packet, to determine one or more differences in selected portions of a header portion of the received ingress packet resulting from processing at the control plane processor, and to store in the memory a new network action based on the one or more differences.

In another example embodiment, a network device method includes receiving an ingress packet having an ingress packet identifying characteristic, detecting with a checking unit whether the identifying characteristic is a match with a stored identifying characteristic of stored first packet flow information, when the match is detected, performing on the received ingress packet a stored network action, using the checking unit, to output an egress packet, the stored network action corresponding to the stored identifying characteristic; when the match is not detected, communicating the ingress packet to a control plane processor configured to process the ingress packet; intercepting from the control plane processor an egress packet corresponding to the communicated ingress packet, with a discovery unit, detecting with the discovery unit one or more differences between at least part of a header portion of the communicated ingress packet and a header portion of the intercepted egress packet, and using a processor core to store in a memory a new network action based on the one or more differences, in association with the unmatched identifying characteristic, as second packet flow information.

DETAILED DESCRIPTION OF EXEMPLARY EMBODIMENTS

In the following discussion, descriptions of well-known functions and constructions may be omitted for increased clarity and conciseness.

Figure 1:
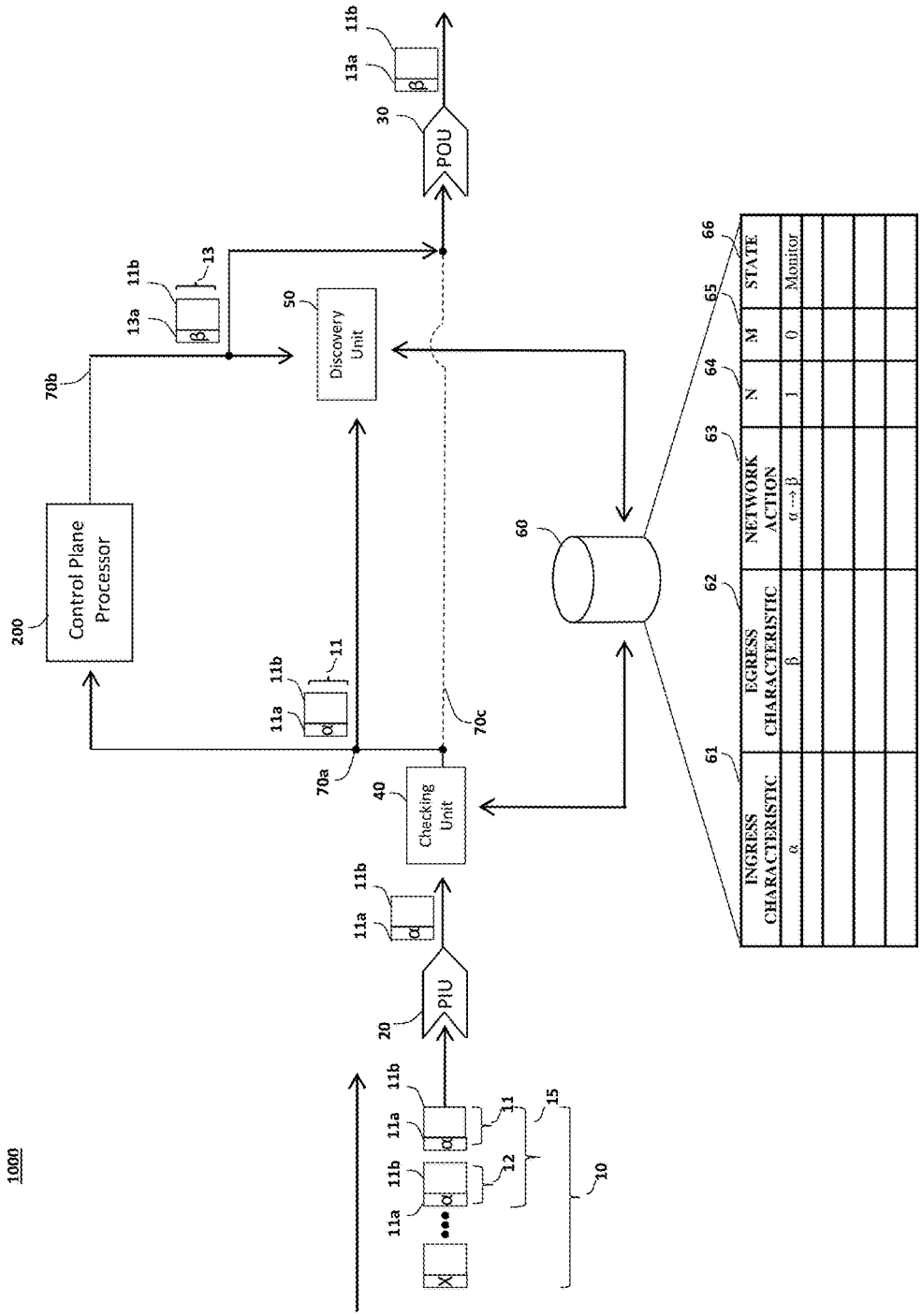
FIG. 1-FIG. 4 are highly simplified illustrative drawings showing a network device configured and operative according to example embodiments.

FIG. 1 shows a network device 1000 which includes a control plane processor 200 a checking unit 40, and a discovery unit 50 and a processing core (not shown). The network device 1000 also includes a packet input unit 20, a packet output unit 30 and a memory 60 according to an example embodiment. The memory 60 is shared between units of the network device 1000 according to an example embodiment, however, in FIG. 16 for instance, the memory 60 is split into multiple memories with individualized unit-access. In FIG. 1, the elements of discovery apparatus 100 are separate from the control plane processor 200, but this arrangement is merely an example embodiment, and, in FIG. 15 for instance, the network device 1000 is integrated as a System on a Chip (SoC) with the control plane processor 200 in example embodiments.

The packet input unit 20 is connected to a stream of ingress packets 10 at an ingress port thereof. The packet input unit 20 communicates ingress packets 10 to a checking unit 40.

The checking unit 40 communicates with the control plane processor 200 and the discovery unit 50 via connection 70a and with the packet output unit 30 via connection 70c. The checking unit 40 interacts with and performs read/write operations upon the memory 60. The checking unit 40 has other components interposed between the packet output unit 30, the discovery unit 50, the memory 60, and the control plane processor 200 according to an example embodiment, for example the processing core (not shown) is interposed between the elements and operates as a mediator controlling the overall operation of the packet input unit 20, the checking unit 40, the discovery unit 50, the memory 60, the packet output unit 30, and the control plane processor 200.

The discovery unit 50 and the packet output unit 30 receive communications from the control plane processor 200 via connection 70b. The discovery unit 50 is connected to the memory 60. The discovery unit 50 interacts with and performs read/write operations at the memory 60, which is shared between the checking unit 40 and the discovery unit 50 according to an example embodiment. The discovery unit 50 includes additional components interposed between the control plane processor 200, the packet output unit 30, and the memory 60 according to an example embodiment.

FIG. 1 also shows a stream 10 of ingress packets 11, 12. The stream 10 includes packets each with an initial ingress packet header 11a and an initial ingress packet payload 11b. The initial ingress packet header 11a includes an initial packet characteristic α. A stream of packets which each contain the same initial packet characteristic α, for example a same source, a same destination, a same type of packet and a same quality of service designation, composes a packet flow 15. Although, FIG. 1 illustrates packets of a single flow, it is to be understood that packets of other flows exist interwoven into the stream 10, for instance see FIG. 2, where one or more other ingress packets each containing a subsequent ingress packet characteristic γ different from the initial ingress packet characteristic α is received between ingress packets 11 and 12.

Returning to FIG. 1, in an example embodiment, the initial ingress packet characteristic α of the initial ingress packet header 11a includes, e.g., any of the following: ETH header information, IP header information, UDP/TCP header information, and the like. These examples of header information are non-limiting.

Packets of a packet flow 15 are seen in FIG. 1. Here, a plurality of ingress packets 10 includes a corresponding initial ingress packet characteristic α. This is just an example, and it is to be noted that packets of a given flow may, but need not, arrive in immediate succession.

The control plane processor 200 is communicatively coupled to the discovery unit 50 and the packet output unit 30 via connection 70b according to an example embodiment. The control plane processor 200 includes other elements interposed between the discovery unit 50 and the packet output unit 30 according to an example embodiment. In an example embodiment, the control plane processor 200 is implemented in a programmable processor and contains various network configurations and routines relating to processing for bridging, routing, NAT, PPPoE, VLAN, IPSec, Layer 7 ALG, L2TP, access control lists, filtering, firewalls, customer extensions, and QoS and the like. These examples are non-limiting.

The control plane processor 200 receives an initial ingress packet 11 and outputs, after processing, an initial egress packet 13 corresponding to the initial ingress packet 11. A control plane processor processes an ingress packet based on various header information; the processing results in the forwarding of the ingress packet to an egress port as an egress packet. The various header information of the ingress packet is different than the corresponding header information of the egress packet, as the egress packet reflects processing decisions of the control plane process. According to an example embodiment, the control plane processor 200 changes an initial packet characteristic α into an initial egress packet header 13a, with an initial egress packet characteristic β, and passes the initial ingress packet payload 11b along with the initial egress packet 13.

The memory 60 stores ingress characteristics 61, egress characteristics 62, network actions 63, monitor thresholds 64, learned thresholds 65, and states 66 according to an example embodiment. The memory 60 stores more data than elements 61-65 according to some example embodiments, and the memory 60 stores less data than elements 61-65 according to other example embodiments.

At the lower portion of FIG. 1, there is illustrated a more detailed view of the memory 60, according to an example embodiment. This more detailed representation of the memory 60 is shown as a table containing six columns corresponding to the previously discussed elements 61-66. The memory 60 stores ingress characteristics 61 of packet flows received by the checking unit 40. The memory 60 also stores egress characteristics 62 of packet flows output from the control plane processor 200. These egress characteristics 62 are used by the discovery unit 50 and the checking unit 40 to make processing decisions. The memory 60 also stores network actions 63 relating ingress characteristics 61 to egress characteristics 62. The memory 60 also stores monitor thresholds 64 and learned thresholds 65 in correspondence with the states 66. The flow states 66 will be discussed momentarily. The above examples are non-limiting, however, and the memory 60 according to other example embodiments contains alternative data and holds data in structures other than tables.

The flow states 66 relate to whether a packet flow 15 has been determined to be in a monitor state, a learned state, or a unstable state) according to a non-limiting example, however, the flow states 66 are merely examples and according to an example embodiment the flow states 66 include multiple other states for use with the network device 1000. A packet of a flow that is in the monitor state is to be monitored to determine changes enacted upon various characteristics of the packet header by the control plane processor. A packet of a flow that is in the learned state is made to have its header changed corresponding to the learned characteristics monitored during the monitor state. A packet of a flow that is in the unstable state is sent to the control plane processor but is not monitored to determine header change characteristics.

The network device 1000 reacts differently to packet flows set to different states. The packet flow will be received by the network device 1000, analyzed by the checking unit 40, and sent to the control plane processor 200 and the discovery apparatus 50 when the packet flow is either a new flow or in the monitor state. According to an example embodiment, only the characteristic of the ingress packet is sent to the discovery apparatus 50. Analysis of the packet involves discovery of one or more packet characteristics designated by the packet header, which is compared with packet characteristics stored in the memory 60.

If the checking unit 40 determines that the packet characteristic is not stored in the memory 60, then an entry corresponding to the characteristic is added to the table and the corresponding flow is set to the monitor state, however, if the packet characteristic is stored in the memory, the network device 1000 makes a determination as to whether the packet characteristic is to be monitored.

When the checking unit 40 makes the determination that the packet is to be monitored, the packet is sent to the control plane processor 200 which designates some network action corresponding to the packet header. The network action is reviewed by the discovery unit 50, which intercepts the packet from the control plane processor 200 stores the action in the memory corresponding to the packet characteristic.

If the checking unit 40 determines that the packet characteristic is associated with a flow set to the learned state, then the checking unit 40 reads and applies the network action, stored in the memory 60, to the packet and sends the packet to the output of the control plane processor 200 corresponding to the network action.

According to an example embodiment, the network action designates that the packet is to be dropped. An ingress packet corresponding to both this network action and a flow of a learned state is correspondingly designated to be dropped in view of the network action learned from the control plane processor.

According to another example embodiment, the network action is learned by the discovery unit to modify the packet header and pass the packet to the packet output unit 30. An ingress packet corresponding to both this network action and a flow of a learned state is correspondingly modified by the checking unit 40 and passed to the egress port of the control plane processor.

The network device 1000 also increments a counter and the like to make determinations regarding switching states corresponding to a packet flow. The counters correspond to, for example, a number of packets which have been received by the network device 1000 corresponding to an same entry and network action or a timing between receipt of packets of different flows, or the like. The network device 1000 is configured to count, via counters, to thresholds for switching to a learned state from a monitor state and vice versa.

The network device 1000 processes ingress packets 10. Returning to FIG. 1, an ingress packet 11 is received at packet input unit 20. The initial ingress packet 11 contains both an initial ingress packet header 11a and initial ingress packet payload 11b. FIG. 1 illustrates an example wherein the initial ingress packet 11 has an initial ingress packet characteristic $\alpha$. Further, the initial ingress packet 11 is of a packet flow 15 which also includes a subsequent ingress packet 12 having an initial ingress packet header 11a with a subsequent ingress packet characteristic $\alpha$ corresponding to that of the initial ingress packet, however, this is merely an example embodiment and the subsequent ingress packet is not of the same packet flow 15 as that of ingress packet 11 according to another example embodiment. Further the packet payload 11b of the ingress packet 11 typically is not the same as the packet payload 11b of the subsequent ingress packet 12, in an embodiment. The packet input unit 20 passes the packet into the network device 1000.

The packet input unit 20 passes the initial ingress packet 11 to the checking unit 40. The checking unit 40 determines when the initial ingress packet characteristic $\alpha$ of the initial ingress packet 11 matches any of the ingress characteristics 61 stored in the memory 60.

According to an example embodiment, the checking unit 40 determines that the initial ingress packet characteristic $\alpha$ matches an ingress packet characteristic that is stored in the memory 60. The checking unit 40 further determines the state of the packet flow 15 by checking states 66. When the checking unit 40 determines that the state of the packet flow is in the monitor state, the packet is sent to the control plane processor 200 and the discovery unit 50 by the checking unit 40. When the checking unit determines that the state of the packet flow is in the learned state, the network action is applied to the packet. When the checking unit 40 determines that the state of the packet flow is in the unstable state, the packet is sent to the control plane processor 200 but is not sent to the discovery unit.

Figure 2:
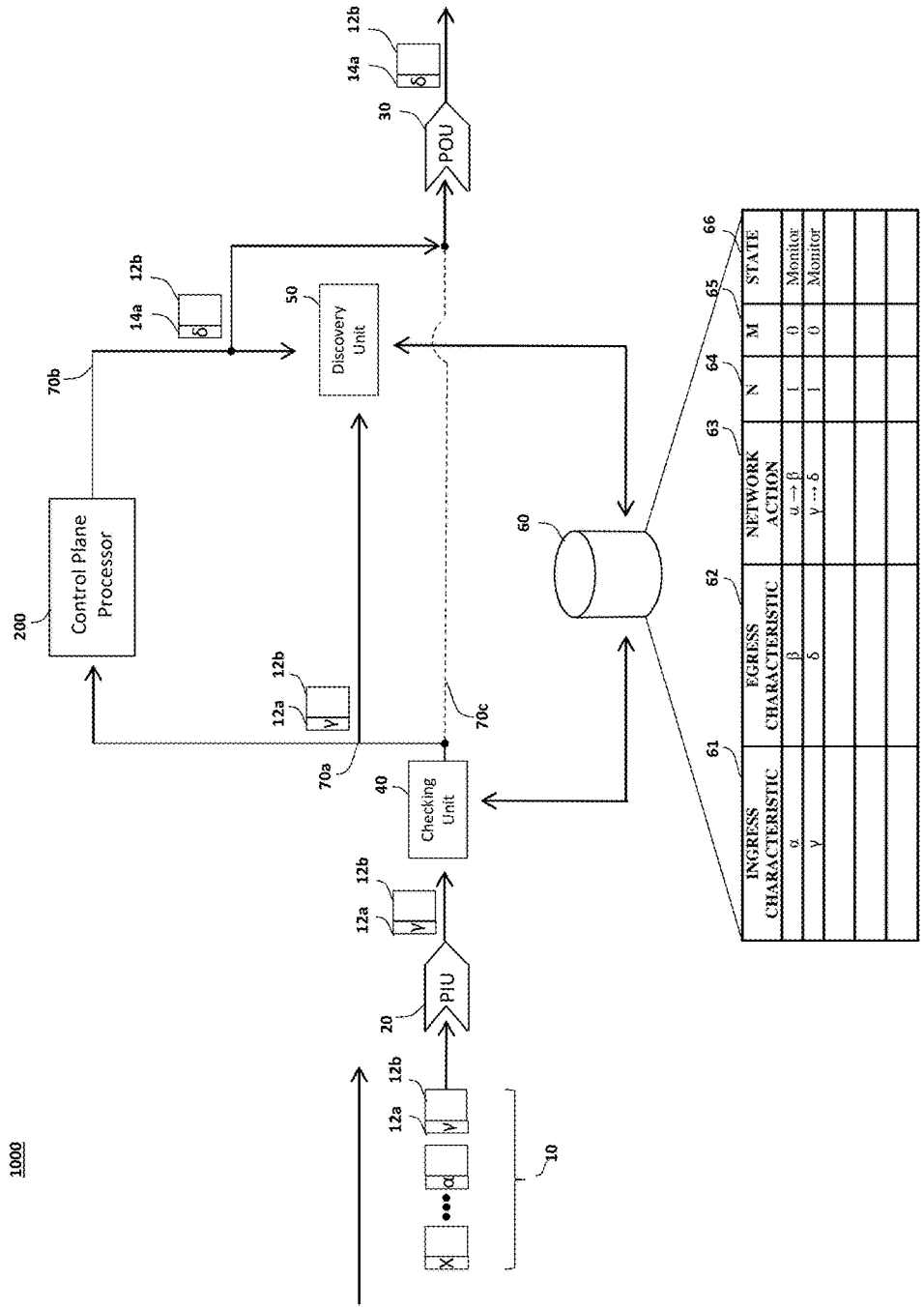

FIG. 2 illustrates a subsequent ingress packet 12 having a subsequent ingress packet characteristic $\gamma$. The subsequent ingress packet 12 is received at the packet input unit 20 and is provided to the checking unit 40 which determines that the subsequent ingress packet characteristic $\gamma$ is not stored in the memory 60. The checking unit 40 stores the subsequent ingress packet characteristic $\gamma$ in the memory 60. The checking unit 40 passes the subsequent ingress packet along connection 70a to the control plane processor 200 and the discovery unit 50. The control plane processor 200 passes a subsequent egress packet 14 along connection 70b to the discovery unit 50 and the packet output unit 30. The discovery unit 50 determines a network action designated to the subsequent ingress packet 12 by the control plane processor 200 with respect to the subsequent egress packet 14. The discovery unit 50 determines the network action to be a change in one or more portions the subsequent ingress packet header 12a to the subsequent egress packet header 14a, wherein the subsequent ingress packet characteristic $\gamma$ is changed to subsequent egress packet characteristic $\delta$. The discovery unit 50 stores the network action in the memory 60.

Figure 3:
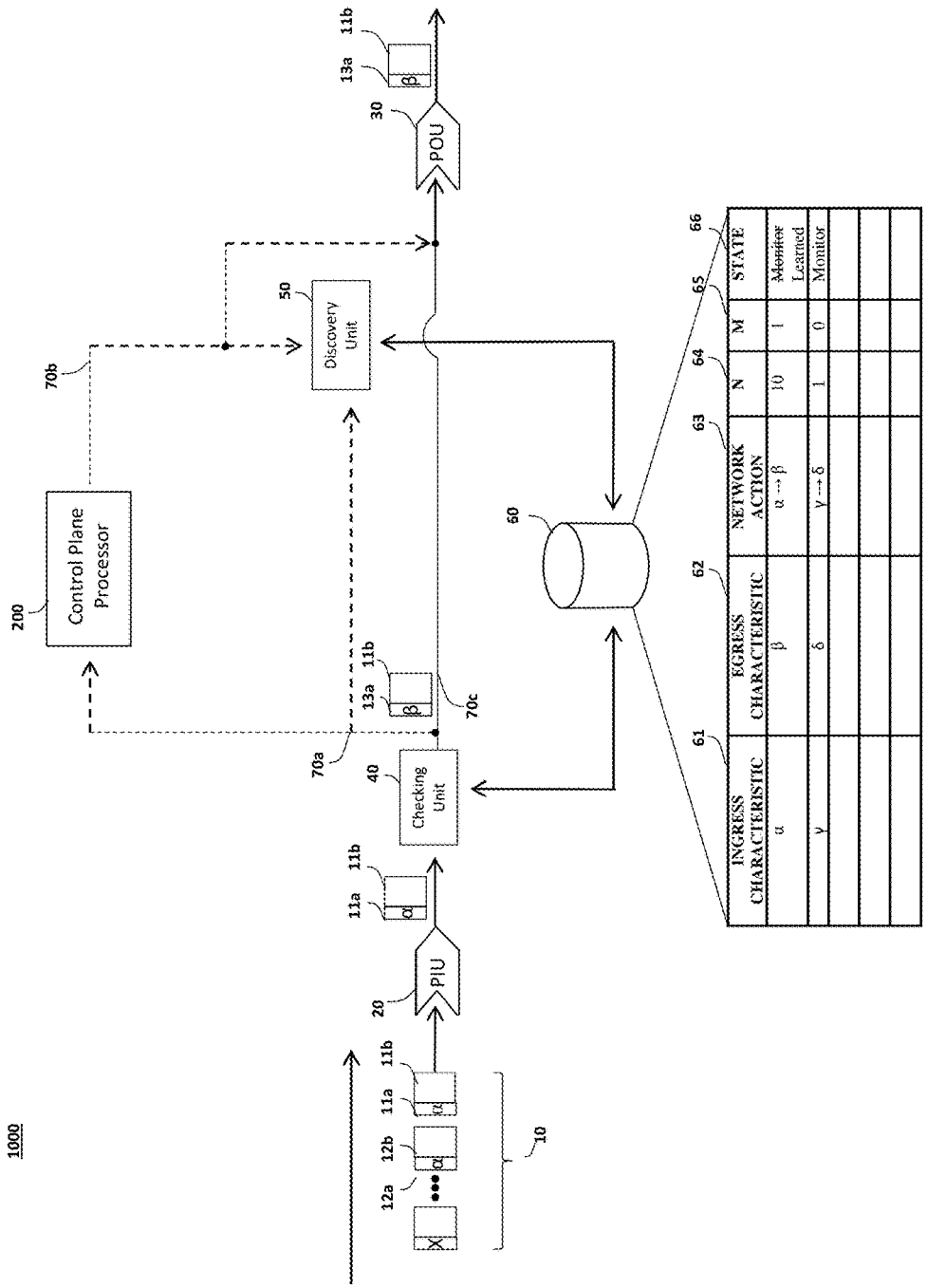

According to an example embodiment, when the checking unit 40 determines both that the initial ingress packet characteristic $\alpha$ is stored in the memory 60 and that the state associated with the packet flow packet flow 15 is set to "learned," the checking unit 40 then applies the network action specified by the network actions 63 of the memory 60. FIG. 3 shows that the checking unit 40 converts the initial ingress packet characteristic $\alpha$ into the initial egress packet characteristic $\beta$ and passes the packet along connection 70c to the packet output unit 30 as the initial egress packet 13; the initial ingress packet 11 is not passed to the control plane processor 200.

According to an example embodiment, when the checking unit 40 determines that the initial ingress packet characteristic $\alpha$ is not stored in the memory 60, the checking unit 40 writes the initial ingress packet characteristic $\alpha$ to the memory 60 and passes the initial ingress packet 11 along connection 70a to the control plane processor 200 and to the discovery unit discovery unit 50, however, this is merely a non-limiting embodiment and initial ingress packet 11 is not passed to the discovery unit 50 by the checking unit checking unit 40 according to an example embodiment, and the discovery unit accesses the memory 60 when comparing the initial egress packet 13 with the initial ingress packet characteristic α.

According to an example embodiment, the discovery unit 50 receives a portion of the initial ingress packet 11 from the checking unit 40.

According to an example embodiment, the discovery unit 50 accesses the ingress characteristics 61 of the memory 60 to determine the initial ingress packet characteristic α.

The discovery unit 50 is further configured, in an embodiment, to receive the initial egress packet 13 after processing by the control plane processor 200. The initial egress packet 13 received by the discovery apparatus from the control plane processor 200 corresponds to the initial ingress packet 12 passed to the control plane processor 200 from the checking unit 40. The discovery unit 50 determines the network action from the control plane processor by comparing the initial ingress packet characteristic α to the initial egress packet characteristic β. The discovery unit 50 stores the network action in the memory 60.

According to an example embodiment the control plane processor 200 passes the initial egress packet to the packet output unit 30. According to an example embodiment the discovery unit 50 passes the initial egress packet to the packet output unit 30.

According to an embodiment, a processing core (reference numeral 610 in FIG. 6, discussed in more detail below) sets a flow state in the memory 60 associated with a flow of the initial ingress packet 11 to be in the monitor state 510 when the checking unit 40 determines that the subsequent ingress packet characteristic γ is not stored in the memory 60.

According to an example embodiment, the processing core (not shown) sets a flow state in the memory 60 associated with a flow of the subsequent ingress packet 13 to be in the monitor state 510 when the checking unit 40 determines that the subsequent ingress packet characteristic γ is not stored in the memory 60.

According to an example embodiment, the processing core increments the monitor thresholds 64, the learned thresholds 65, and the timed thresholds 67 of the memory 60.

According to an example embodiment, the processing core increments the monitor thresholds 64, when a packet flow state is set to the monitor state 510, corresponding to a packet flow 15 when the discovery unit 50 determines for a corresponding initial egress packet 13 that a change from an initial ingress packet characteristic α to an initial egress packet characteristic β matches the network action, corresponding to the packet flow 15, stored in the memory 60.

FIG. 3 illustrates that the processing core (not shown) determines that the incremented monitor threshold 65 corresponding to a packet flow 15 has reached a configurable threshold N (in this example, the threshold N is 10). The processing core subsequently changes the state of the packet flow 15 from the monitor state 510 to the learned state 520.

According to an example embodiment, the processing core increments the learned thresholds 65, when a packet flow state is set to the learned state 520, corresponding to a packet flow 15, when the checking unit 40 determines for an initial ingress packet 11 that its corresponding initial ingress packet characteristic α matches the ingress characteristic stored in the memory 60.

According to an example embodiment, the processing core determines whether the incremented learned threshold 65 corresponding to a packet flow 15 has reached a configurable threshold M. The processing core subsequently changes the state of the packet flow 15 from the learned state to the monitor state 510.

Figure 4:
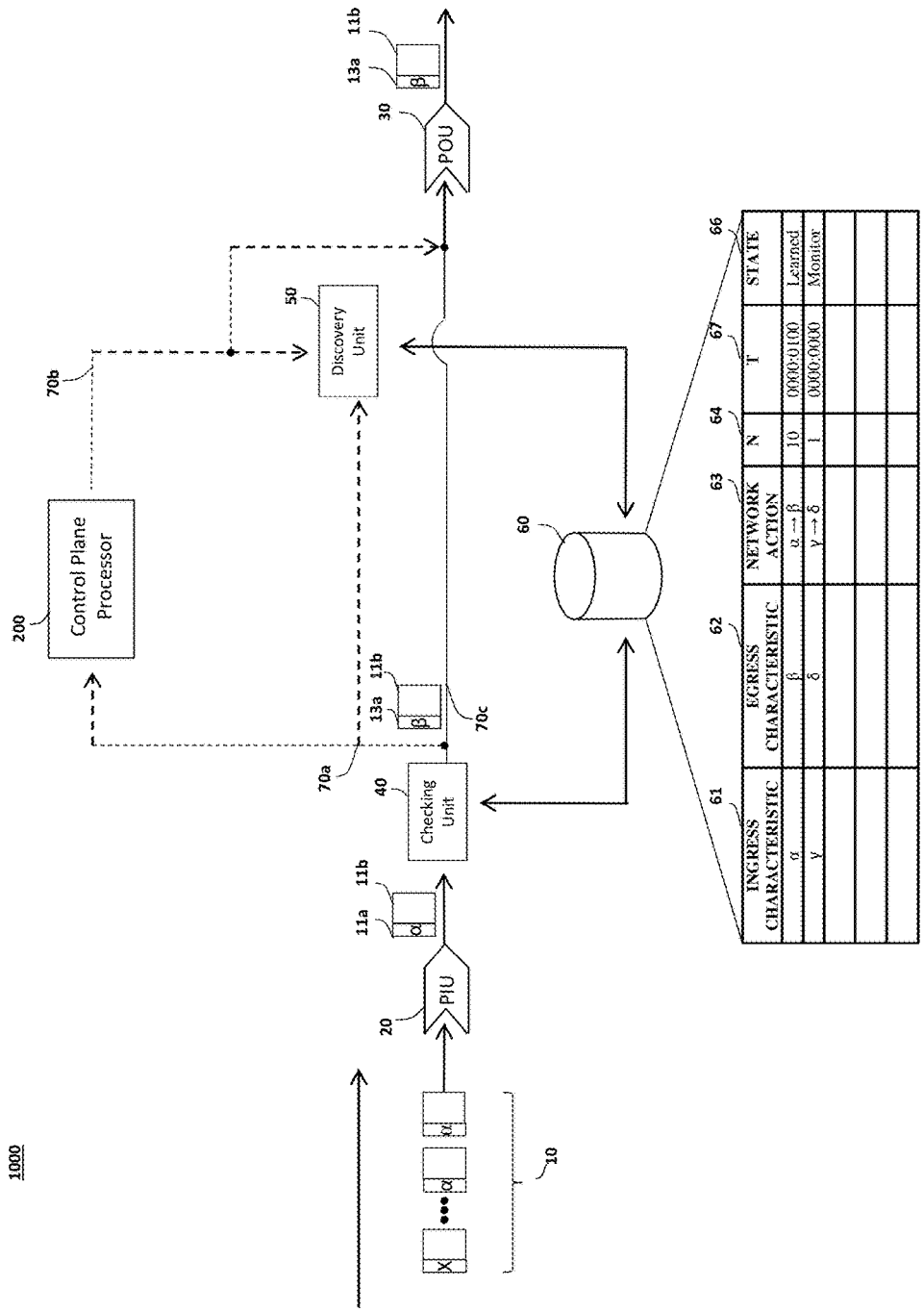

FIG. 4 illustrates that the processing core increments the timed threshold 67. The increments of the timed threshold 67 correspond to a period of time elapsed since the packet flow was changed from the monitor state to the learned state. According to an example embodiment, the processing core increments the timed threshold 67 to correspond to a period of time from when the packet flow state was set to the learned state. According to an example embodiment, the processing core 610 increments the timed threshold to correspond to a period of time from when the most recent packet of the corresponding packet flow 15 was received by the checking unit 40.

According to an example embodiment, when the processing core determines that the incremented timed threshold 67 has reached a configurable threshold T, the processing core subsequently changes the state of the packet flow 15 from the learned state to the monitor state.

Figure 5:
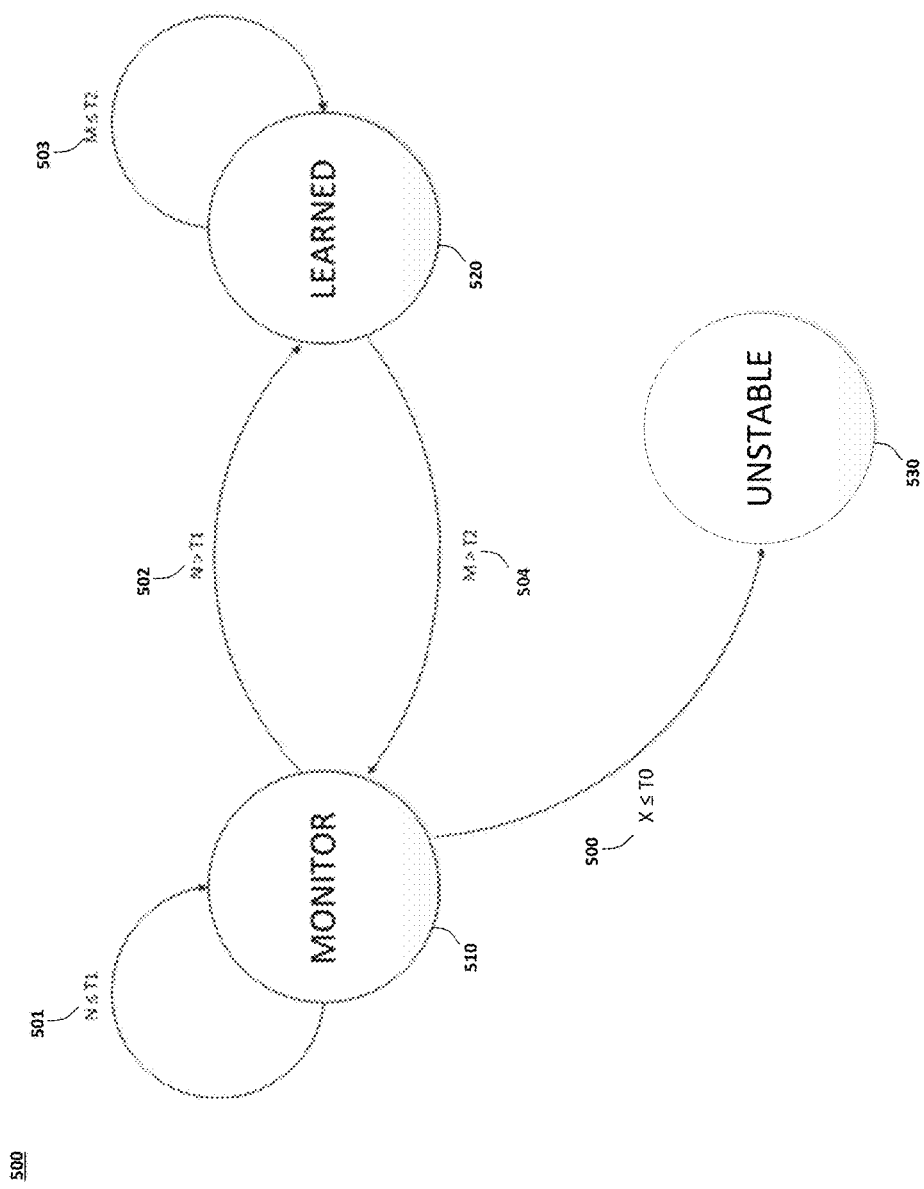
FIG. 5 is a state diagram of an example machine according to an example embodiment.

FIG. 5 illustrates a state diagram 500 showing both states and transition states for a packet flow. The state diagram 500 includes the monitor state 510, the learned state 520, and the unstable state 530 in an example embodiment. When a flow state is set to the monitor state 510, any initial ingress packets 12 corresponding to the packet flow 15 are "monitored."

According to an example embodiment, the discovery unit discovery unit 50 determines the network action of the control plane processor on a packet associated with the initial ingress packet characteristic α and initial egress packet characteristic β, as shown in FIG. 1. The discovery unit 50 subsequently stores the network action in the memory 60 as one of the network actions 63.

FIG. 5 also illustrates a flow state of a packet flow 15 in the learned state 520. An initial ingress packet 12 of corresponding to the packet flow is determined to be "learned."

In the learned state 520 the initial ingress packet 12 of a learned flow is not passed to the control plane processor 200, however, this is a non-limiting embodiment, and an initial ingress packet of a learned flow may be passed to the control plane processor 200 for verification purposes and the like. According to an example embodiment, when the processing core determines that the transition condition 501 is met, the N, a number matching network actions corresponding to a packet flow, is less than or equal to a first configurable threshold. When the processing core determines that the transition condition 501 is met, the packet flow state remains in the monitor state 510.

According to an example embodiment, when the processing core determines that the transition condition 502 is met, the N has exceeded the threshold T1, the state of the packet flow 15 is changed to the learned state 520.

According to an example embodiment, when the processing core determines that the transition condition 503 is met, the M, a counter corresponding to a packet flow in a learned state 520, is less than or equal to a second configurable threshold, T2. When transition condition 502 is met, the corresponding packet flow remains in the learned state 520.

According to an example embodiment, when the processing core determines that the transition condition 504 is met, the M has exceeded T2, the packet flow state is changed to the monitor state 510.

According to an example embodiment, the counter M corresponds to a number of packets received by the checking unit 40 while the corresponding packet flow is in the learned state. According to another example embodiment, the counter M corresponds to a passage of time since the packet flow was changed to the learned state. According to another example embodiment, the counter M corresponds to a passage of time since the most recent packet of the corresponding packet flow was received by the checking unit 40. According to another example embodiment, the counter M may be any combination of the above example embodiments.

According to an example embodiment, when the processing core determines that a egress characteristic of a packet does not match the egress characteristic of another packet of the same flow, the processing core increments a counter X. When X reaches a configurable threshold T0, the processing core implements transition condition 500 thereby setting the corresponding packet flow to the unstable state 530.

According to an example embodiment, any threshold data corresponding to a packet flow 15 stored in the memory 60 is erased when the state of the packet flow 15 is changed. According to an example embodiment, any threshold data corresponding to a packet flow 15 in the memory 60 is not erased when the state of the packet flow 15 is changed. According to an example embodiment the configurable thresholds are reconfigured at any time.

Figure 6:
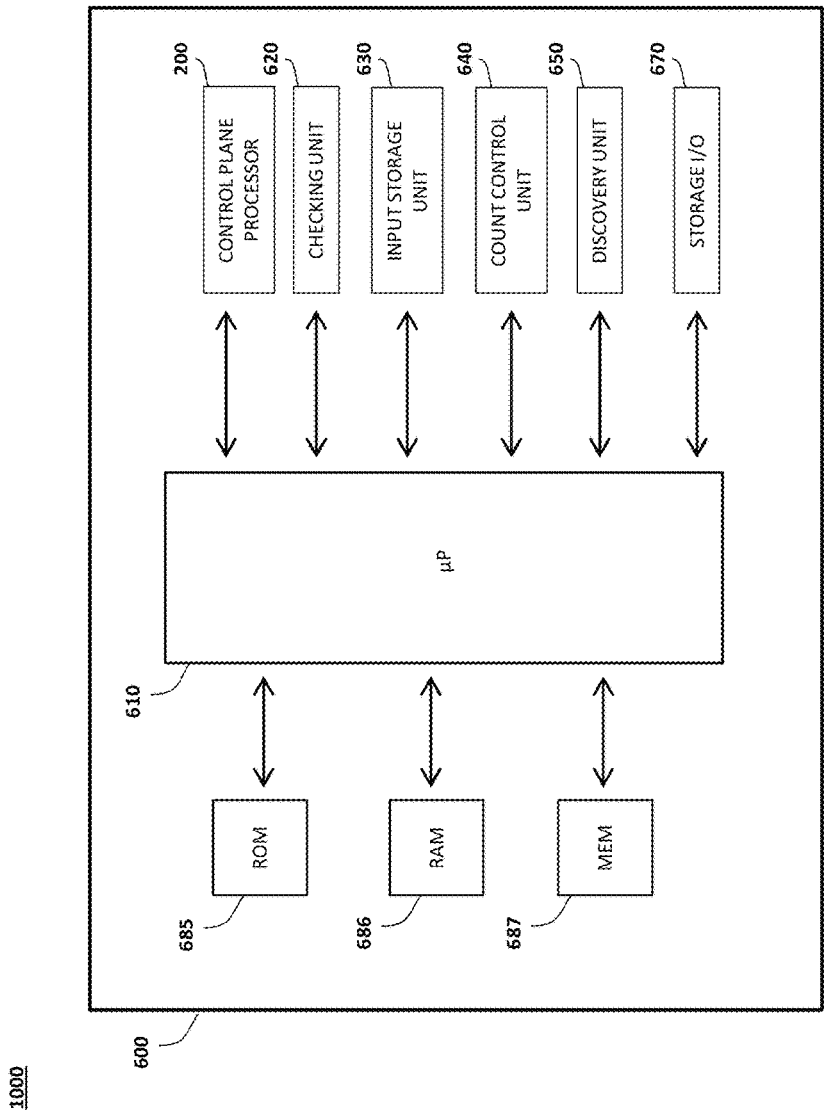
FIG. 6 is a highly simplified illustrative drawing showing a concept of operation according to example embodiments.

FIG. 6 depicts a System on Chip implementation 600 wherein the components of network device 1000 correspond to each other through the processing core 610.

The network device 1000 includes a checking unit 620, an input storage unit 630, a count control unit 640, a discovery unit 650, and a storage I/O 670. The network device 1000 also includes various memories such as ROM 685, RAM 686, and other memory 687. The memories store data related to network actions and are accessible to the other components of the network device 1000.

The input storage unit 630 and storage I/O 670 access the memories to perform read/write operations related to at least the network device 1000, and further carry out read/write operations related count control unit 640 which performs incremented counting operations. The components of the network device 1000 communicate with each other via the processing core 610 which transmits various indicators and signals corresponding to monitored and learned packet flows.

According to an example embodiment, the processing core 610 allows the network device 1000 to operate as a hardware component of the network device 1000. According to an example embodiment, the processing core 610 allows the network device 1000 to operate as a software component of the network device 1000. According to an example embodiment the checking unit 620 is a hardware unit, and according to another example embodiment the checking unit 620 is a software unit, e.g. in Linux software.

FIG. 6 also illustrates the input storage unit 630. According to an example embodiment, the processing core 610 uses the input storage unit 630 to perform memory operations corresponding to the memory 687 which may be subsequently accessed.

FIG. 6 also illustrates the count control unit 640. According to an example embodiment, the processing core 610 uses the count control unit 640 to increment counting operations corresponding to the transition condition of state diagram 500 and also the various states associated with the packet flows.

FIG. 6 also illustrates the storage I/O 670. According to an example embodiment, the processing core 610 uses the storage I/O 670 to access various memories such as ROM 685, RAM 686, and other memory 687.

Figure 7:
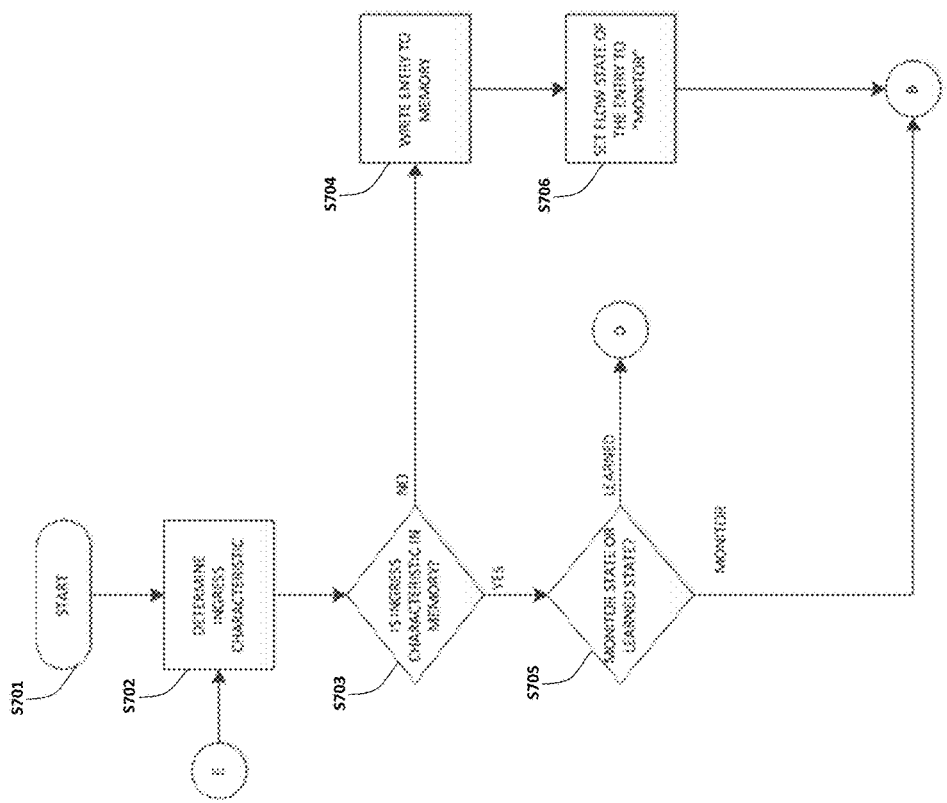
FIG. 7 is a flow diagram of an example method according to example embodiments.

FIG. 7 is a flow diagram of an example algorithm and method according to example embodiments when a packet is received by the checking unit. The example method of FIG. 7 may be applied to multiple example embodiments wherein the network device is utilized. At S701, the network device receives an initial ingress packet.

At S702, the network device determines the ingress characteristic of the packet of the initial ingress packet header. Processing then continues to S703.

At S703, if the ingress characteristic is found in the memory, processing continues to S705. On the other hand, if the ingress characteristic is not found in the memory, processing continues to S704.

At S704, since the ingress characteristic is not stored, it is written in the memory as a new row. Following this, at S706, the flow state corresponding to the newly-entered ingress characteristic is set to the monitor state. Processing then continues via connector B to that shown in FIG. 8.

Returning to S705, when the ingress characteristic was found in the memory, it is determined whether the corresponding state is in the monitor state or the learned state. If the state corresponding to the found ingress characteristic is the monitor state, processing continues via connector B to that shown in FIG. 8. On the other hand, if the corresponding state is the learned state, processing continues via connector D to that shown in FIG. 10.

Figure 8:
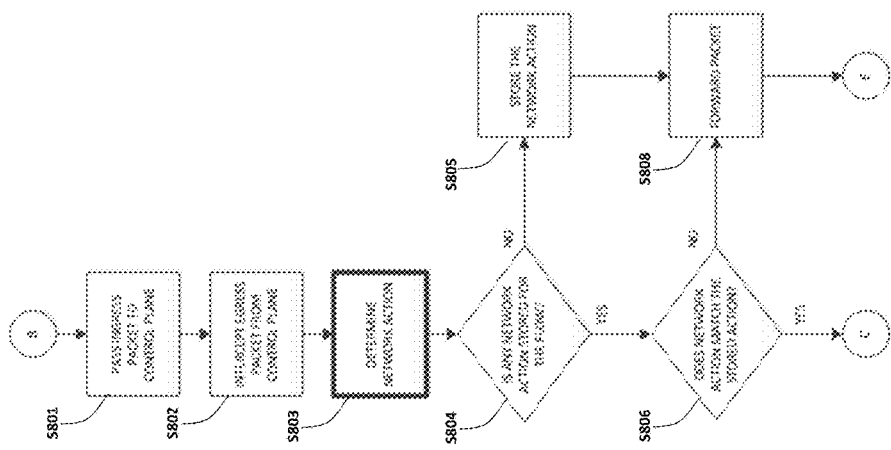
FIG. 8 is a flow diagram of an example method according to example embodiments.

FIG. 8 is a flow diagram of an example algorithm for a packet of a flow that is set to the monitor state and method according to example embodiments wherein the network device is utilized. The example method of FIG. 8 may be applied to multiple example embodiments. At S801, the network device passes an initial ingress packet to the control plane processor.

At S802, the network device intercepts an egress packet destined to the control plane processor. The egress packet corresponding to the initial ingress packet sent to the control plane processor at S801. According to an embodiment, the egress packet is also sent to the discovery apparatus. At S803, the network device determines what network action was applied to the initial ingress packet by comparing a characteristic of the initial ingress packet with a corresponding characteristic of the egress packet and determining changes made to the packet by the control plane processor, for example changes to the packet header.

Figure 11:
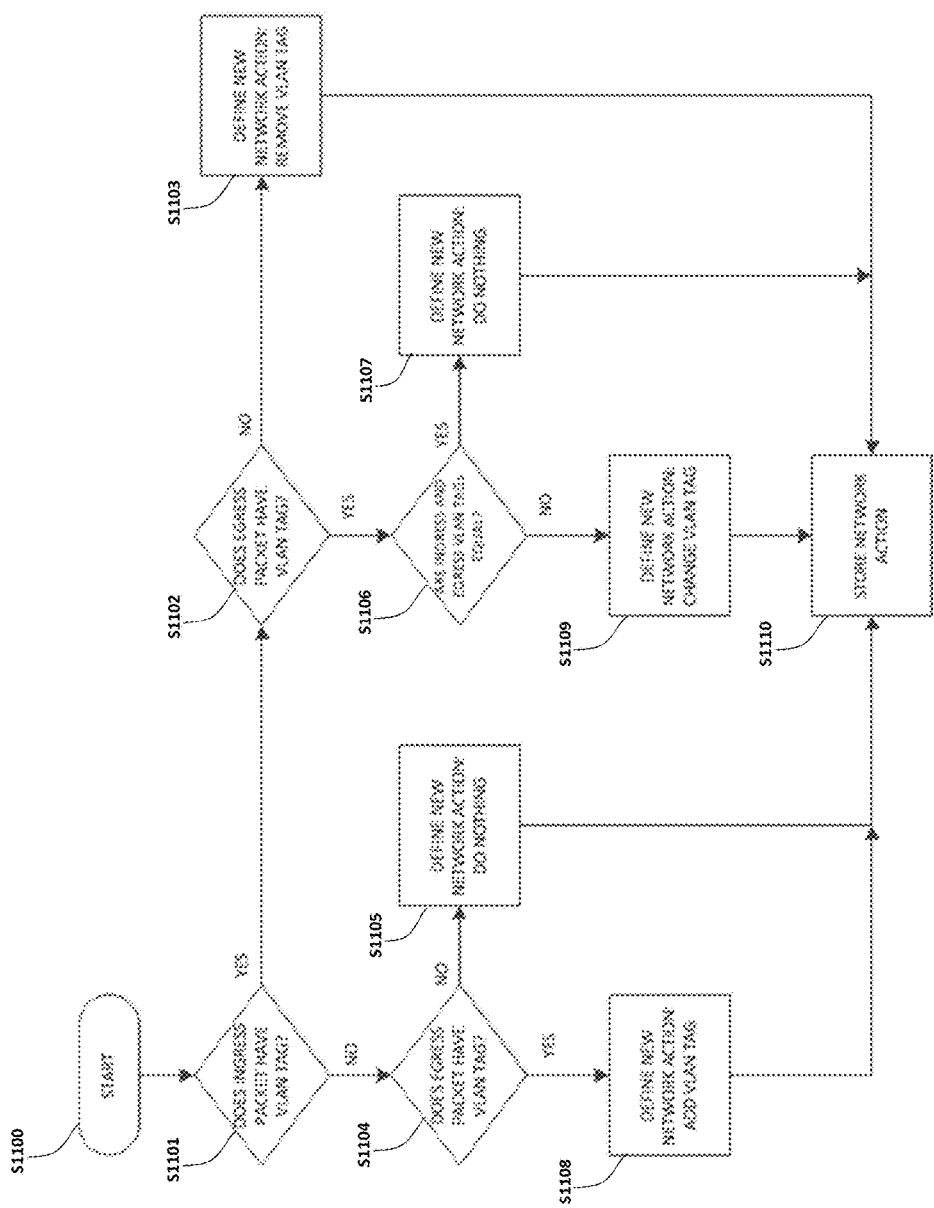
FIG. 11 is a flow diagram of an example method according to example embodiments.
Figure 12:
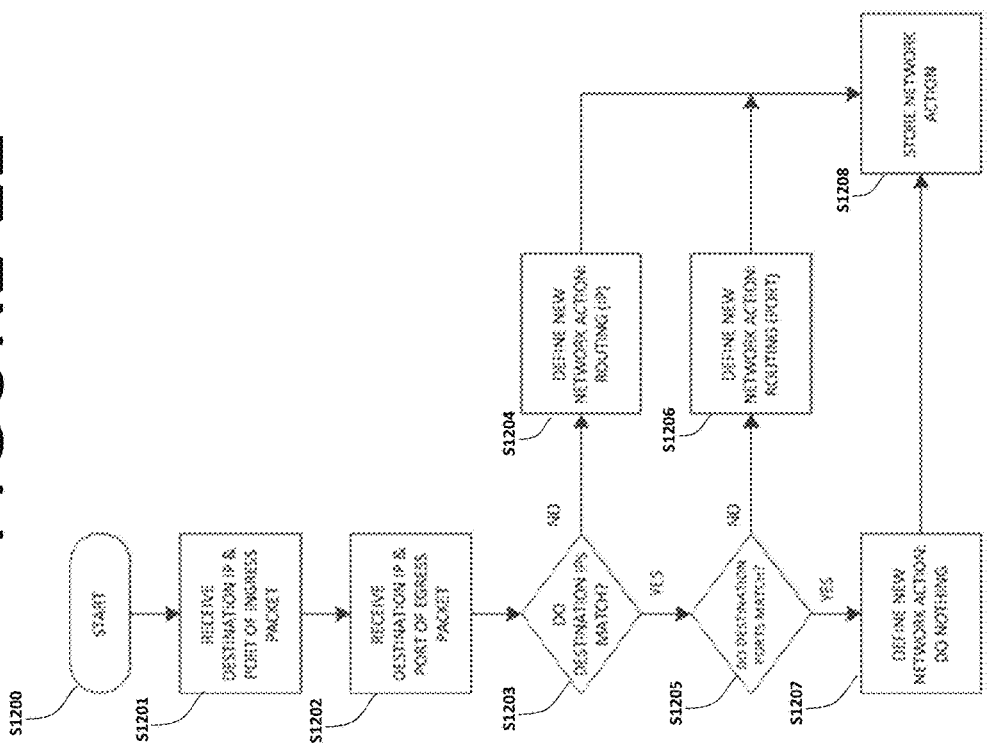
FIG. 12 is a flow diagram of an example method according to example embodiments.
Figure 13:
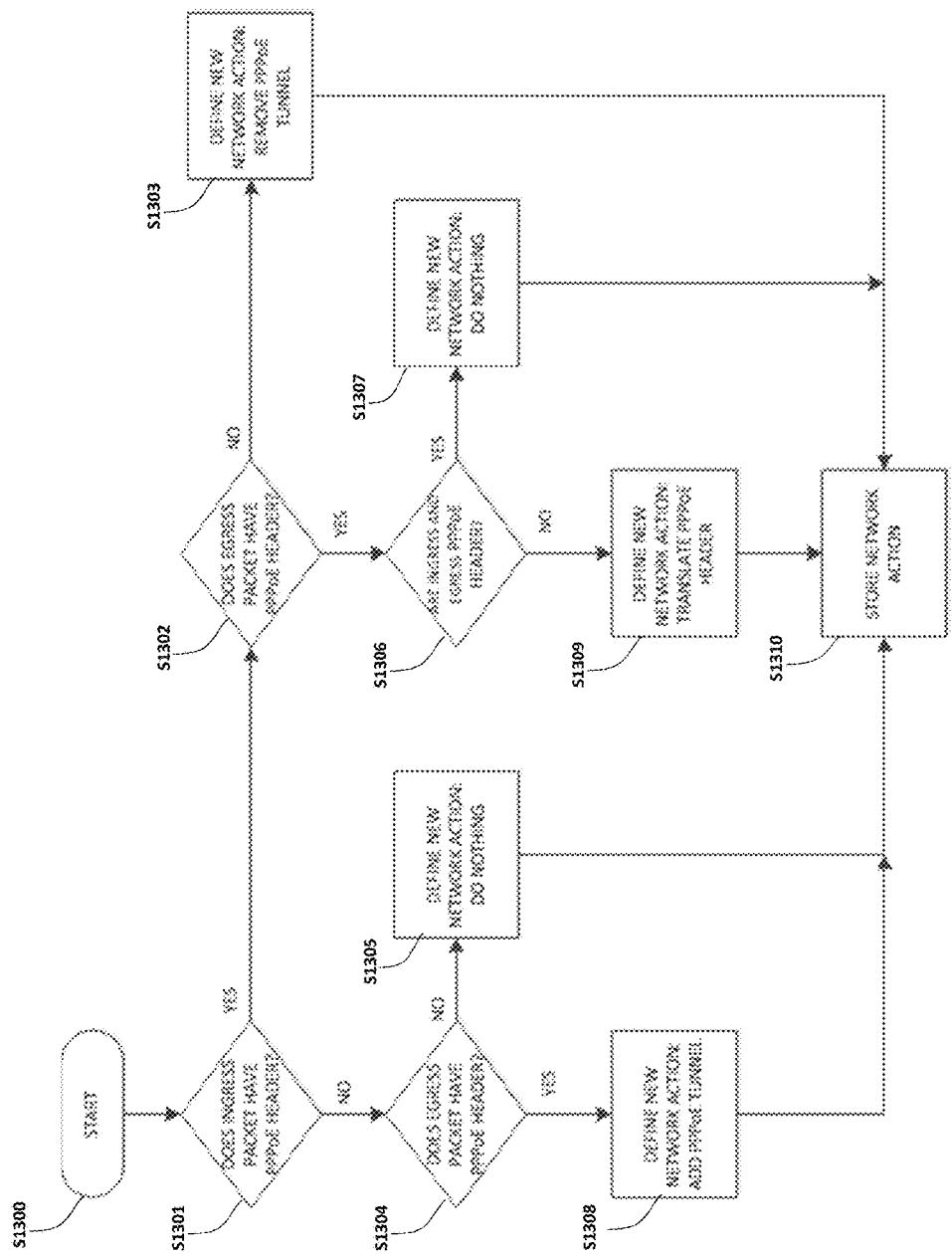
FIG. 13 is a flow diagram of an example method according to example embodiments.

At S803, according to multiple non-limiting example embodiments, the network device determines the network action based on any of the methods, or by any combination of the methods, shown in FIGS. 11-13 which illustrates multiple algorithms to each determine a specific type of change to the packet header.

At S804, the network device determines if the determined network action for the corresponding flow is found stored in a memory.

At S805, when the network action is not stored, the network device stores the network action, and at S808, will forward the packet based on the network action designated by the control plane processor, and continue processing via connector E as shown in FIG. 7.

At S806, when the network action is stored, the network device will determine if the stored network action matches the determined network action.

At S808, when the stored network action does not match the determined network action, the network device will, forward the packet based on the network action designated by the control plane processor and processing will continue via connector E as shown in FIG. 7.

Figure 9:
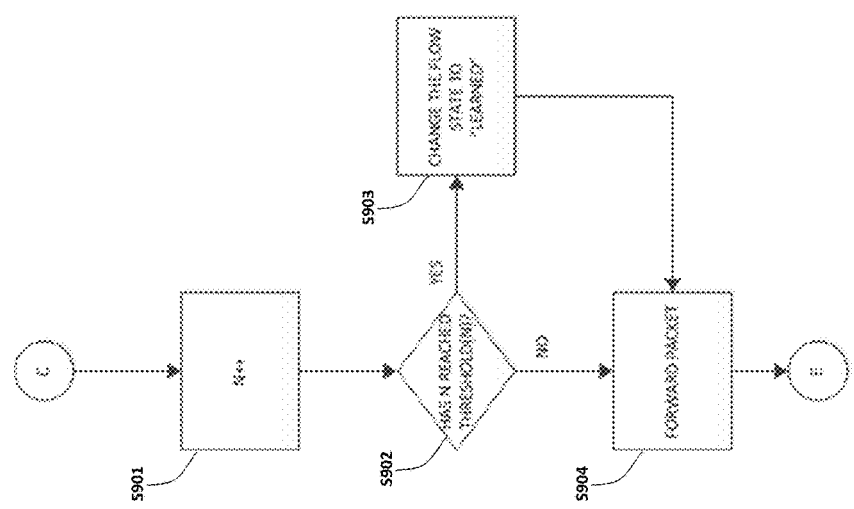
FIG. 9 is a flow diagram of an example method according to example embodiments.

Returning to S806, when the stored network action matches the determined action, then the processing continues via connector C to that shown in FIG. 9.

FIG. 9 is a flow diagram of an example algorithm and method according to example embodiments. The example method of FIG. 9 may be applied to multiple example embodiments wherein the network device is utilized At S901, the network device determines whether a stored network action matches a presently determined network action for a corresponding flow and subsequently increments the counter N.

At S902, the network device 1000 determines if the counter N, stored in the memory 60, has reached a configurable threshold.

At S903, when the network device 1000 determines that the counter N has reached the configurable threshold, the network device 1000 changes the flow state corresponding to the determined network action to the learned state 520, forwards the packet at S904, and continue processing via connector E as shown in FIG. 7.

At S903, when the network device 1000 determines that the counter N has not reached the configurable threshold, at S904, the network device 1000 forwards the packet and processing continues via connector E as shown in FIG. 7.

Figure 10:
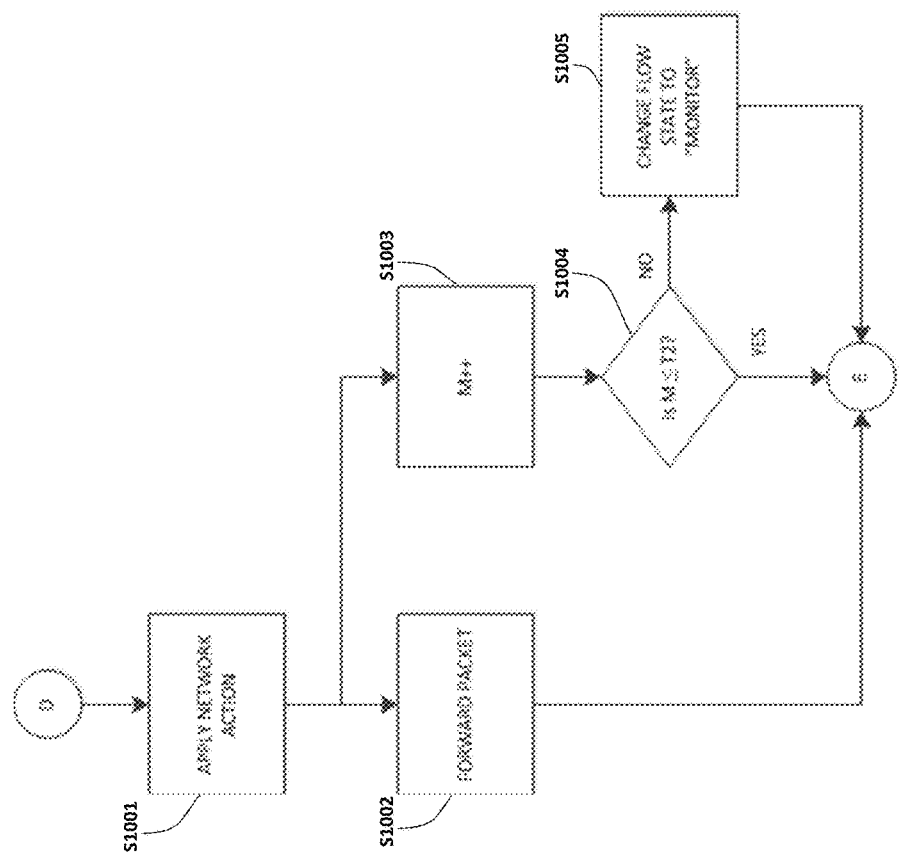
FIG. 10 is a flow diagram of an example method according to example embodiments.

FIG. 10 is a flow diagram of an example algorithm and method according to example embodiments. The example method of FIG. 10 may be applied to multiple example embodiments At S1001, when the checking unit determines that an ingress packet belongs to a packet flow which is classified as in the learned state 520, the checking unit applies the stored network action to the ingress packet corresponding to the flow. At S1002, the network device then performs the corresponding action and forwards the packet corresponding to the network action, and in parallel to S1002, at S1003 the network device increments the learned state threshold counter M.

At S1005, the network device determined that the learned state threshold counter M reached the learned state threshold T2 and changed the flow state to the monitor state. Processing continues via connector E as shown in FIG. 7 whereby the network device is waiting for another ingress packet.

FIG. 11 is a flow diagram of an example algorithm and method according to example embodiments whereby the network device monitors VLAN tag characteristics of a packet prior to and post-control plane processing. The example method of FIG. 11 may be applied to multiple example embodiments At S1100, the discovery apparatus network device attempts to discover the network action as discussed with respect to S803.

At S1101, the network device determines if the ingress packet has a VLAN tag.

At S1102, the network device determined that the ingress packet has a VLAN tag, and determines whether the egress packet has a VLAN tag.

At S1103, when the network device determines that the egress packet does not have a VLAN tag, it defines a new network action to remove the VLAN tag, and at S1110, stores the new action.

At S1106, when the network device determines that the egress packet has a VLAN tag, it also determines whether the ingress and egress VLAN tags are equal.

At S1107, when the network device determines that the VLAN tag are equal, it defines a new network action to do nothing, and at S1110 stores the new action.

At S1109, when the network device determines that the VLAN tags are not equal, it defines a new network action to change the VLAN tag, and at S1110, stores the new action.

Returning to S1101, when the network device determines that the ingress packet does not have a VLAN tag, at S1104, the network device determines whether the egress packet has a VLAN tag.

At S1105, when the network device determines that the egress packet does not have a VLAN tag, it defines a new network action to do nothing, and at S1110, stores the new action.

At S1108, when the network device determines that the egress packet does have a VLAN tag, it defines a new network action to add the VLAN tag, and at S1110, stores the new action.

FIG. 12 is a flow diagram of an example algorithm and method according to example embodiments whereby the network device monitors destination IP and port characteristics of a packet prior to and post-control plane processing. The example method of FIG. 12 is applied to multiple example embodiments wherein the network device is utilized At S1200, the discovery apparatus network device attempts to discover the network action as discussed with respect to S803.

At S1201, the network device receives the destination IP and port addresses found in the header of an ingress packet.

At S1202, the network device receives the destination IP and port addressed found in the header of an egress packet corresponding to the ingress packet which has been passed to the discovery apparatus from the control plane processor.

At S1203, the network device determines whether the destination IP address of an ingress packet matches the destination IP address of the corresponding egress packet.

At S1204, when the network device determines that the destination IP addresses do not match for corresponding ingress and egress packets, it defines a new network action for routing based on the IP address change in the egress packet header, and at S1208, stores the network action.

At S1205, when the destination IP addresses of corresponding ingress and egress packets match, the network device determines whether the destination ports also match for corresponding ingress and egress packets.

At S1206, when the network device determines that the destination ports do not match for the ingress and egress packets, it defines a new network action for routing based on the port change in the egress packet header, and at S1208, stores the network action.

At S1207, when the network device determines that the destination ports do match for the ingress and egress packets, it defines a new network action to do nothing, and at S1208, stores the network action.

FIG. 13 is a flow diagram of an example algorithm and method according to example embodiments whereby the network device monitors PPPoE tunnel characteristics of a packet prior to and post-control plane processing. The example method of FIG. 13 may be applied to multiple example embodiments as discussed wherein the network device is utilized At S1300, the discovery apparatus network device 1000 attempts to discover the network action regarding PPPoE tunnel characteristics as discussed with respect to S803.

At S1301, the network device determines whether the ingress packet has a PPPoE header.

At S1302, when the network device determines whether the egress packet has a PPPoE header.

At S1303, when the network device determines that the egress packet does not have a PPPoE header, because there is a different between the PPOE header of the ingress packet and the corresponding egress packet it defines a new network action to remove the PPPoE tunnel, and at S1310, stores the network action.

At S1306, when the network device determines that the egress packet does have a PPPoE header it further determines whether the ingress and egress PPPoE headers match.

At S1307, when the network device determines that the ingress and egress PPPoE headers do match, it defines a new network action to do nothing, and at S1310, stores the network action.

At S1309, when the network device determines that the ingress and egress PPPoE headers do not match, it defines a new network action to translate the PPPoE header based on the egress packet, and at S1310, stores the network action.

Returning to S1301, when the network device determines that the ingress packet does not have a PPPoE header, at S1304, the network device 1000 determines whether the egress packet has a PPPoE header.

At S1305, when the network device determines that the egress packet does not have a PPPoE header, defines a new network action to do nothing, and at S1310 stores the network action the case when both the ingress and corresponding egress packet do not have a PPPoE header.

At S1308, when the network device determines that the egress packet does have a PPPoE header, even though the corresponding ingress packet does not have a PPPoE header, it defines a new network action to add a PPPoE tunnel to the egress packet, and at S1310, stores the network action.

Figure 14:
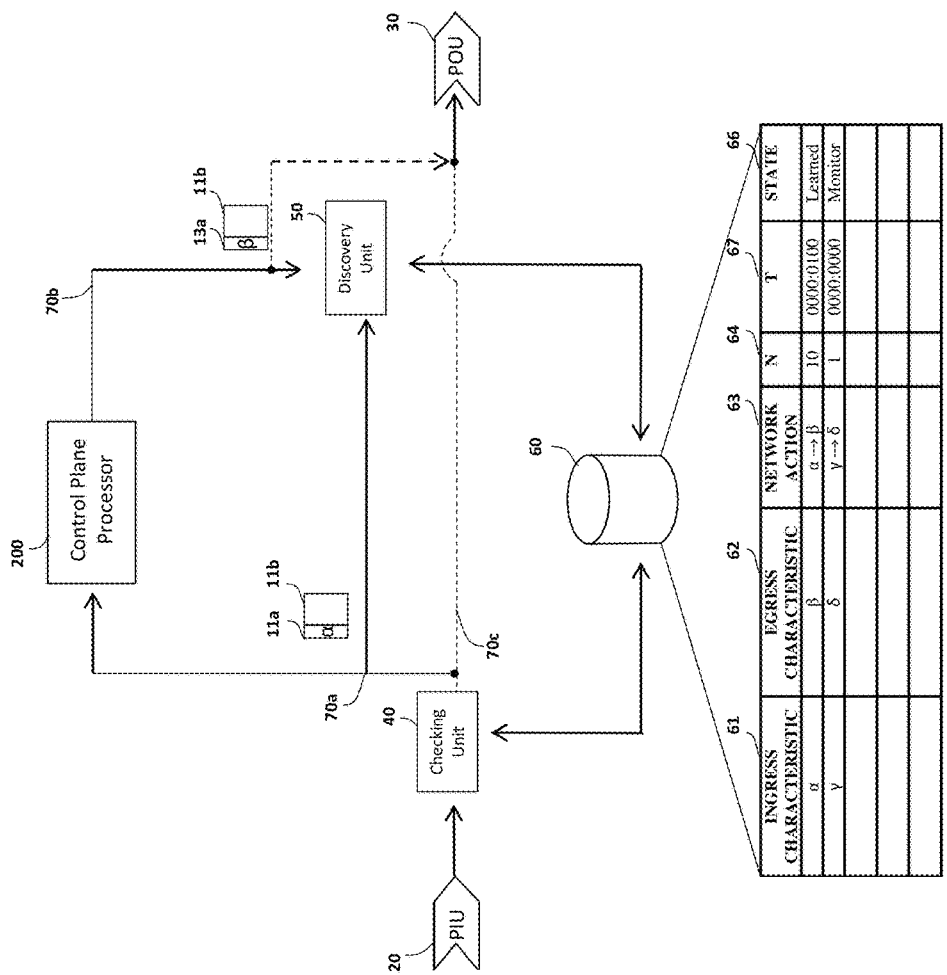
FIG. 14-FIG. 17 are highly simplified illustrative drawings showing a concept of operation according to example embodiments.

FIG. 14 shows the network device 1000 in which the network device 1000 has entered into a configurable testing mode. According to an example embodiment, the processing core (not shown) causes the checking unit 40 to produce the pseudo-ingress packet 14 mimicking a packet of the packet flow 15 which is in the learned state. The pseudo-ingress packet 14 is sent to the control plane processor 200. According to an example embodiment, a subsequent initial egress packet 13 is received by the discovery unit 50 from the control plane processor 200. The processing core 610 determines the network action applied to the pseudo-ingress packet 14.

According to an example embodiment, the pseudo-ingress packet 14 received the same network action from the control plane processor 200 as stored by the memory 60, and the processing core 610 returns the network device 1000 to normal operation.

According to an example embodiment, the pseudo-ingress packet 14 receives a different network action from the control plane process 200 in view of the network action stored by the memory 60. The processing core 610 changes the state of the corresponding flow to the monitor state 510, and the network device 1000 returns to normal operation.

It is noted that the network device 1000 allows for an increased network throughput rate in situations where packet flows are present. The network device 1000 obviates the requirement that network actions be applied to every packet by the typically slower path represented by the control plane processor 200. When a packet flow is learned, the appropriate network action is applied to subsequent packets in the flow by the checking unit, resulting in a typically much faster processing path.

Figure 15:
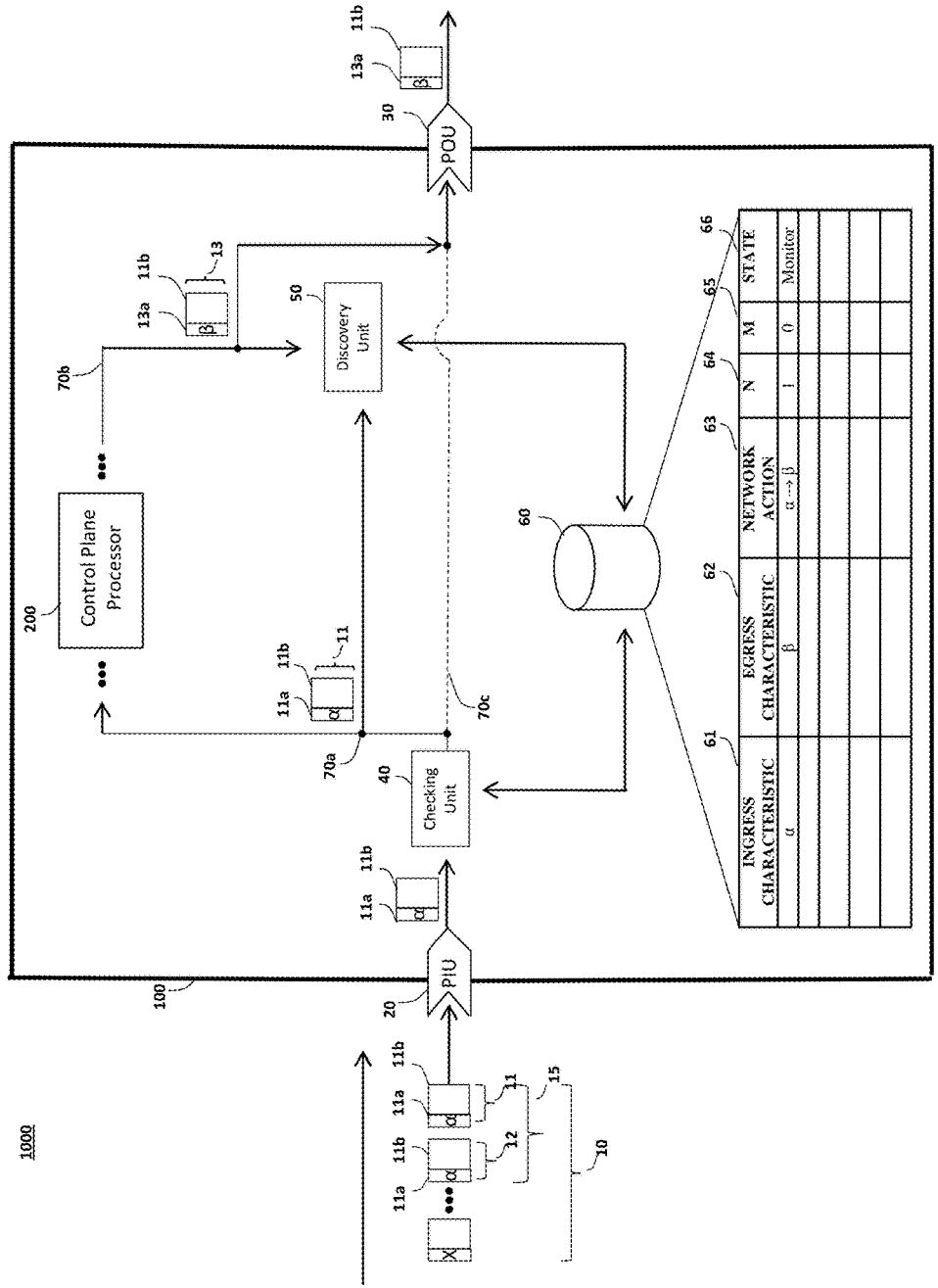

From the foregoing, it is noted that the network device 1000 treats the control plane processor as a unit, the network device 1000 therefore allows for discovery of control rules which are inferred from raw packet flows. The network device 1000 also allows for non-intrusive discovery of network actions independent of the particularities of the control plane processor and its implementation details. Thus, particularities such as custom extensions, kernel versions, and the like, all of which are closely related to the control plane processor, are implemented and updated in the control plane processor without any need for change at the discovery apparatus, in an embodiment. Furthermore, the memory of the network device 1000 allows for a unified representation of control plane information while reducing the complexity of data structures which describe the network topology. That is to say, the control plane processor contains complex rules for handling packets of a flow, however, the network device 1000 simplifies the complex rules of the control plane processor into FIG. 15 illustrates an example embodiment wherein the network device 1000 is integrated as a System on a Chip (SoC) 100. The SoC 100 includes substantially similar components to those discussed with respect to FIG. 1, including the packet input unit 20, packet output unit 30, checking unit 40, discovery unit 50, memory 60, and control plane processor 200. The ingress port of the packet input unit 20 is illustrated as being on the left side of the packet input unit 20 and located at a border of the SoC 100, however, this is merely an example embodiment and the ingress port of the packet input unit 20 is located entirely within the network device 1000 in an example embodiment, and the ingress port of the packet input unit 20 is located entirely outside of the network device 1000 in an example embodiment.

Figure 16:
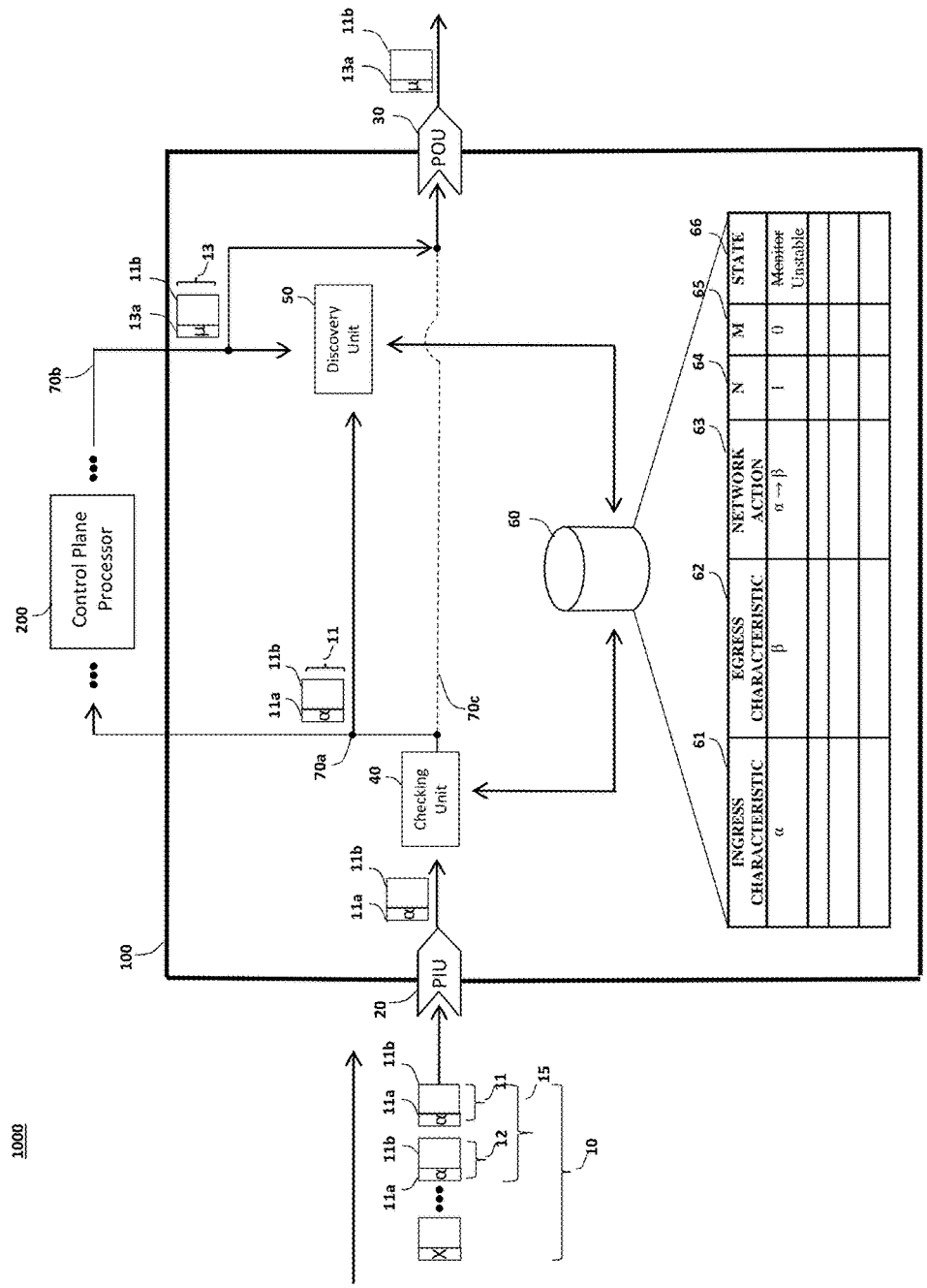

FIG. 16 illustrates an example embodiment wherein the network device 1000 is substantially similar to that shown in FIG. 3. A subsequent ingress packet 13 arrives at the packet input unit 20. The subsequent ingress packet characteristic γ corresponds to the characteristic stored in memory 60 in the ingress characteristic 61 column. The discovery unit 50 receives the subsequent egress packet from the control plane, however, the subsequent egress packet characteristic does not correspond to the subsequent egress packet characteristic stored in the memory in the egress characteristic column 62. The processing core 610 (not shown) is configured to set the flow state of the corresponding flow to the unstable state, as shown in state 66 column. According to an embodiment, any packets corresponding to a packet flow set to the unstable state are sent to the control plane processor by the network device 1000 and are not sent to the discovery apparatus 50. The network device 1000 implements counters similar to those for the learned state for setting a flow in a unstable state to a flow in a monitor state. Further, the network device 1000 counts to a threshold number of a plurality of subsequent egress packet with characteristics not corresponding to the characteristic stored in the memory 60.

Figure 17:
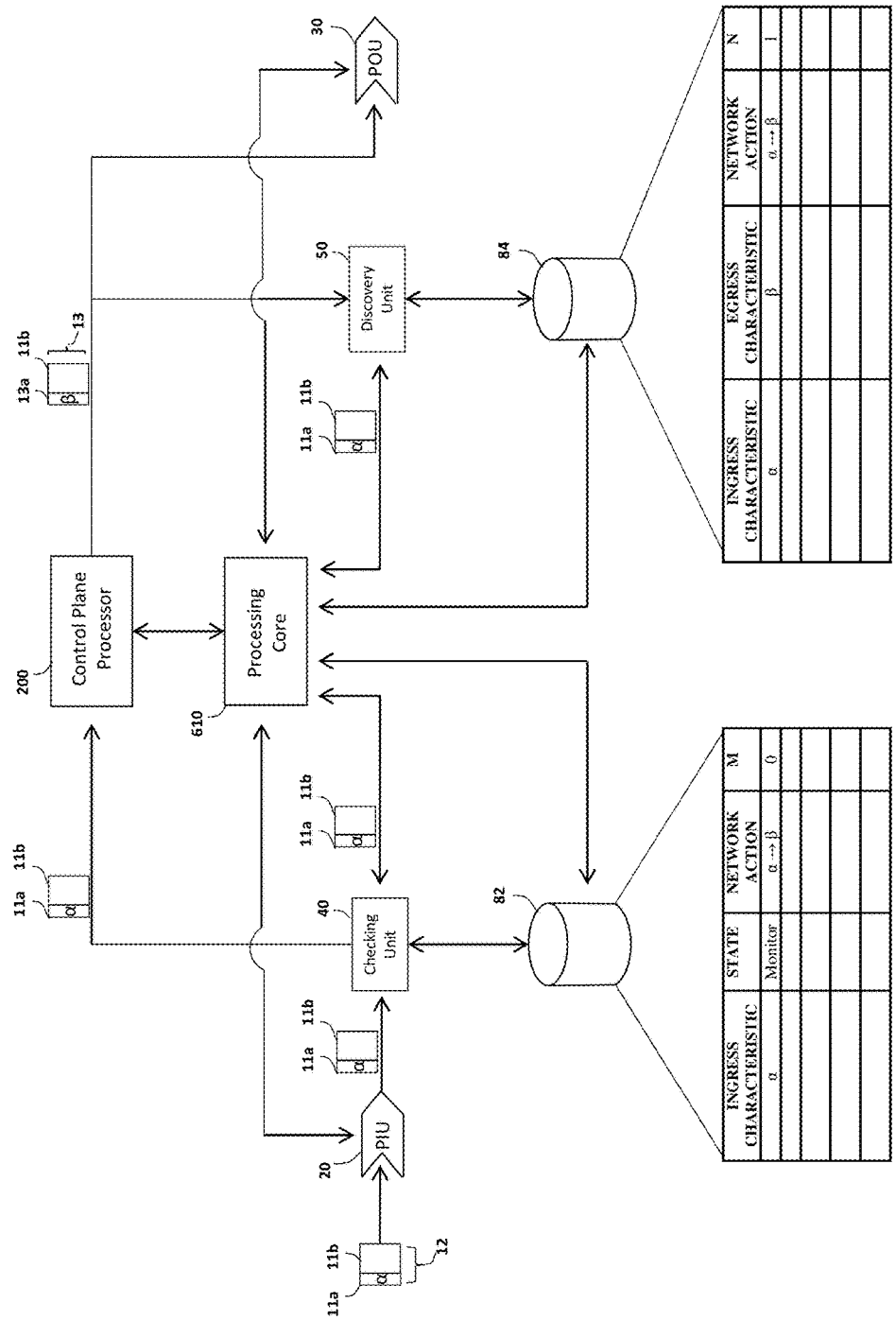

FIG. 17 illustrates an example embodiment wherein the network device 1000 operates with separate memories, memory 82 and memory 84, corresponding to checking unit 40 and discovery unit 50 respectively. The network device 1000 of FIG. 17 further illustrates the processing core 610 communicatively coupled to the packet input unit 20, the packet output unit 30, the checking unit 40, the discovery unit 50, the memory 82, the memory 84, and the control plane processor 200.

Although the inventive concept has been described above with respect to the various example embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, one should not interpret that such specific order and/or arrangements are limited, or that all the operations performed and the components disclosed are needed to obtain a desired result. Accordingly, other implementations are within the scope of the following claims.

What is claimed is:

1. A network device comprising:
a memory;
a control plane processor configured to perform one or more processing operations on a first packet of a packet flow received via an ingress port, wherein the processing operations cause the first packet to be forwarded to an egress port;
a discovery unit configured to determine, after performance of the one or more processing operations on the first packet by the control plane processor, one or more differences in a header of the first packet resulting from the performance of the processing operations on the first packet by the control plane processor, the one or more differences in the header being determined by comparing: (i) one or more attributes of the header before ingress of the first packet to the control plane processor, and (ii) the one or more attributes of the header after egress of the first packet from the control plane processor, wherein the discovery unit is further configured to store one or more indications of the one or more differences in the memory in association with the packet flow; and
a checking unit configured to modify a second packet by applying the one or more indicated differences stored in the memory to a header of the second packet of the packet flow without communicating the second packet to the control plane processor, wherein the second packet is received via the ingress port;
wherein the network device is configured to forward the second packet to the egress port.

2. The network device according to claim 1, wherein
the discovery unit is further configured to store the one or more indications of the one or more differences in the memory in association with an identifying characteristic of the packet flow, and
the checking unit is further configured to modify the second packet by applying the indicated one or more differences to the header of the second packet in response to determining that the second packet comprises the identifying characteristic of the packet flow stored by the discovery unit in the memory.

3. The network device according to claim 1, wherein:
the control plane processor is further configured to apply the one or more differences to the header of the first packet by modifying a forwarding address indicating an address at which to transmit packets of the packet flow;
the control plane processor is further configured to modify the forwarding address by at least one of i) changing a Virtual Local Area Network (VLAN) tag of the first packet, ii) adding the VLAN tag to the first packet, and iii) removing the VLAN tag from the first packet; and
the checking unit is further configured to, in accordance with the modification of the forwarding address in the header of the first packet applied by the control plane processor, perform at least one of i) change a VLAN tag of the second packet, ii) add the VLAN tag to the second packet, and iii) remove the VLAN tag from the second packet.

4. The network device according to claim 1, wherein
the control plane processor is further configured to apply the one or more differences to the header of the first packet by modifying a forwarding address indicating an address at which to transmit packets of the packet flow;
the control plane processor is further configured to modify the forwarding address by at least one of i) changing a destination Internet Protocol (IP) address of the first packet and ii) changing a destination port of the first packet in a case in which the destination IP address is not changed; and
the checking unit is further configured to, in accordance with the modification of the forwarding address in the header of the first packet applied by the control plane processor, perform at least one of i) change a destination IP address of the second packet and ii) change a destination port of the second packet.

5. The network device according to claim 1, wherein
the control plane processor is further configured to apply the one or more differences to the header of the first packet by modifying a forwarding address indicating an address at which to transmit packets of the packet flow;
the control plane processor is further configured to modify the forwarding address by at least one of i) changing a Point-to-Point Protocol over Ethernet (PPPoE) tunnel indicated by the first packet, ii) adding an indication of the PPPoE tunnel to the first packet, and iii) removing the indication of the PPPoE tunnel from the first packet; and
the checking unit is further configured to, in accordance with the modification of the forwarding address in the header of the first packet applied by the control plane processor, perform at least one of i) change a PPPoE tunnel indicated by the second packet, ii) add an indication of the PPPoE tunnel to the header of the second packet, and iii) remove the indication of the PPPoE tunnel from the header of the second packet.

6. The network device according to claim 1, wherein
the checking unit is further configured to determine whether subsequent packets are part of the packet flow,
the discovery unit is further configured to set the packet flow to a learned state in response to determining that the one or more differences have been applied to a predetermined number of packets of the packet flow by the control plane processor,
the checking unit is further configured to apply the one or more differences, without transmitting the subsequent packets to the control plane processor, to the subsequent packets of the packet flow in a first case in which packet flow is set to the learned state, and
the checking unit is further configured to transmit the subsequent packets of the packet flow to the control plane processor in a second case in which the packet flow is not set to the learned state until the packet flow is set to the learned state.

7. The network device according to claim 6, wherein
the checking unit is further configured, in the first case in which the packet flow is set to the learned state, to set the packet flow to a monitor state in response to the checking unit applying the one or more differences to a second predetermined number of packets of the packet flow, the checking unit is further configured, in response to setting the packet flow from the learned state to the monitor state, to transmit at least one subsequent packet of the subsequent packets to the control plane processor, the discovery unit is further configured to determine whether the control plane processor applies the one or more differences to the at least one subsequent packet, the discovery unit is further configured, in response to determining that the control plane processor applies the one or more differences to the at least one subsequent packet, to reset the packet flow to the learned state, and the discovery unit is further configured, in response to determining that the control plane processor applies a second difference other than the one or more difference to the at least one subsequent packet, to maintain the packet flow in the monitor state until the discovery unit determines that the second difference has been applied to the predetermined number of packets of the packet flow.

8. A network method comprising:

communicating a first packet of a packet flow received via an ingress port of a network device to a control plane processor of the network device;

performing, by the control plane processor, one or more processing operations on the first packet of the packet flow;

after performing the one or more processing operations on the first packet by the control plane processor, determining, by a discovery unit of the network device, one or more differences in a header of the first packet resulting from performance of the processing operations, the differences in the header being determined by comparing: (i) one or more attributes of the header before ingress of the first packet to the control plane processor, and (ii) the one or more attributes of the header after egress of the first packet from the control plane processor;

storing, by the discovery unit, one or more indications of the one or more differences in a memory in association with the packet flow;

forwarding, by the control plane processor, the first packet to an egress port of the network device;

communicating a second packet of the packet flow received via the ingress port to a checking unit;

applying, by the checking unit, the one or more differences indicated by the memory to a header of the second packet of the packet flow without communicating the second packet to the control plane processor; and forwarding, by the network device, the second packet to the egress port.

9. The network method according to claim 8, further comprising storing, by the discovery unit, one or more indications of the one or more differences in the memory in association with an identifying characteristic of the packet flow, and applying, by the checking unit, the indicated one or more differences to the header of the second packet in response to determining that the second packet comprises the identifying characteristic of the packet flow stored in the memory by the discovery unit.

10. The network method according to claim 8, further comprising, applying, by the control plane processor, the one or more differences to the header of the first packet by modifying a forwarding address indicating an address at which to transmit packets of the packet flow;

modifying, by the control plane processor, the forwarding address by at least one of changing i) a Virtual Local Area Network (VLAN) tag of the first packet, ii) adding the VLAN tag to the first packet, and iii) removing the VLAN tag from the first packet; and applying the one or more differences indicated by the memory to the header of the second packet of the packet flow without communicating the second packet to the control plane processor comprises: in accordance with the modification of the forwarding address in the header of the first packet applied by the control plane processor, performing at least one of i) changing, by the checking unit, a VLAN tag of the second packet, ii) adding, by the checking unit, the VLAN tag to the second packet, and iii) removing, by the checking unit, the VLAN tag from the second packet.

11. The network method according to claim 8, wherein applying, by the control plane processor, the one or more differences to the header of the first packet by modifying a forwarding address indicating an address at which to transmit packets of the packet flow;

modifying, by the control plane processor, the forwarding address by at least one of i) changing a destination Internet Protocol (IP) address of the first packet, and ii) changing a destination port of the first packet in a case in which the destination IP address is not changed; and applying the one or more differences indicated by the memory to the header of the second packet of the packet flow without communicating the second packet to the control plane processor comprises: in accordance with the modification of the forwarding address in the header of the first packet applied by the control plane processor, performing at least one of i) changing, by the checking unit, a destination IP address of the second packet and ii) changing, by the checking unit, a destination port of the second packet.

12. The network method according to claim 8, wherein applying, by the control plane processor, the one or more differences to the header of the first packet by modifying a forwarding address indicating an address at which to transmit packets of the packet flow;

modifying, by the control plane processor, the forwarding address by at least one of i) changing a Point-to-Point Protocol over Ethernet (PPPoE) tunnel indicated by the first packet, ii) adding an indication of the PPPoE tunnel to the first packet, and iii) removing the indication of the PPPoE tunnel from the first packet; and applying the one or more differences indicated by the memory to the header of the second packet of the packet flow without communicating the second packet to the control plane processor comprises: in accordance with the modification of the forwarding address in the header of the first packet applied by the control plane processor, performing at least one of i) changing, by the checking unit, a PPPoE tunnel indicated by the second packet, ii) adding, by the checking unit, an indication of the PPPoE tunnel to the header of the second packet, and iii) removing, by the checking unit, the indication of the PPPoE tunnel from the header of the second packet.

13. The network method according to claim 8, further comprising:

determining, by the checking unit, whether subsequent packets are part of the packet flow, setting, by the discovery unit, the packet flow to a learned state in response to determining that the one or more differences have been applied to a predetermined number of packets of the packet flow, applying, by the checking unit, the one or more differences, without transmitting the subsequent packets to the control plane processor, to the subsequent packets of the packet flow in a first case in which packet flow is set to the learned state, and transmitting, by the checking unit, the subsequent packets of the packet flow to the control plane processor in a second case in which the packet flow is not set to the learned state until the packet flow is set to the learned state.

14. The network method according to claim 13, further comprising:

setting, by the checking unit and in the first case in which the packet flow is set to the learned state, the packet flow to a monitor state in response to applying the one or more differences to a second predetermined number of packets of the packet flow, transmitting, by the checking unit and in response to setting the packet flow from the learned state to the monitor state, at least one subsequent packet of the subsequent packets to the control plane processor, determining, by the discovery unit, whether the control plane processor applies the one or more differences to the at least one subsequent packet, resetting, by the discovery unit and in response to determining that the control plane processor applies the one or more differences to the at least one subsequent packet, the packet flow to the learned state, and maintaining, by the discovery unit and in response to determining that the control plane processor applies a second difference other than the one or more difference to the at least one subsequent packet, the packet flow in the monitor state until the discovery unit determines that the second difference has been applied to the predetermined number of packets of the packet flow.

* * * * *